US006208288B1

(12) United States Patent
Shoucri et al.

(10) Patent No.: US 6,208,288 B1

(45) Date of Patent: Mar. 27, 2001

(54) MILLIMETER WAVE ALL AZIMUTH FIELD OF VIEW SURVEILLANCE AND IMAGING SYSTEM

(75) Inventors: Merit M. Shoucri, Manhattan Beach; Thomas K. Samec, Los Angeles, both of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/100,508

(22) Filed: Jun. 19, 1998

(51) Int. Cl.[7] .............................. G01S 13/93; G01S 7/483

(52) U.S. Cl. ................................ 342/179; 342/11; 342/33; 342/36

(58) Field of Search .............................. 342/179, 11, 190, 342/191, 22, 29, 33, 36

(56) References Cited

U.S. PATENT DOCUMENTS

| | | | | |
|---|---|---|---|---|
| 3,713,156 | * | 1/1973 | Pothier | 342/22 |
| 4,866,454 | * | 9/1989 | Droessler et al. | 343/725 |
| 4,910,523 | | 3/1990 | Huguenin et al. | 342/179 |
| 4,927,251 | * | 5/1990 | Schoen | 359/364 |
| 4,940,986 | | 7/1990 | Huguenin | 342/410 |
| 5,047,783 | | 9/1991 | Hugenin | 342/179 |
| 5,073,782 | * | 12/1991 | Huguenin et al. | 342/179 |
| 5,170,169 | | 12/1992 | Stephan | 342/179 |
| 5,202,692 | | 4/1993 | Huguenin et al. | 342/179 |
| 5,438,336 | | 8/1995 | Lee et al. | 342/174 |
| 5,530,247 | | 6/1996 | McIver et al. | 250/336.1 |
| 5,751,243 | * | 5/1998 | Turpin | 342/179 |

FOREIGN PATENT DOCUMENTS

| | | | | |
|---|---|---|---|---|
| 9955258 | * | 3/2000 | (AU) . | |
| 0809123 A2 | | 11/1997 | (EP) . | |
| 0966060 A1 | * | 12/1999 | (EP) | H01Q/19/06 |

* cited by examiner

*Primary Examiner*—John B. Sotomayor
(74) *Attorney, Agent, or Firm*—Michael S. Yatsko

(57) ABSTRACT

A passive millimeter-wave imaging system (10) is disclosed that provides a full 360° instantaneous azimuthal field-of-view (54) image of a scene. The imaging system (10) makes use of a spherical Luneburg lens (12) and a series of millimeter-wave direct detection receivers (24) configured in a ring (16) around the lens (12), and positioned at the focal plane of the lens (12). The series of receivers (24) are positioned on a plurality of consecutive sensor cards (14), where each card (14) includes a certain number of the receivers (24). The receivers (24) define a one-dimensional focal plane array with limited obscuration, and thus give a 360° instantaneous field-of-view (54) of a slice of the scene. Processing circuitry (32), including a multiplexing array interface for multiplexing the signals from the receivers (24), are positioned on an outer ring (34) outside of the sensor card ring (16). Mechanical actuators (42) are provided to cause the rings (16, 34) to move together in a precessional motion about the lens (12) so that the rings (16, 34) precess at a fixed angle Θ about a fixed reference direction (46), thus providing an elevational scan of +/−Θ about the plane perpendicular to the reference direction (46).

26 Claims, 2 Drawing Sheets

MILLIMETER WAVE ALL AZIMUTH FIELD OF VIEW SURVEILLANCE AND IMAGING SYSTEM

BACKGROUND OF THE INVENTION

1. Field of the Invention

This invention relates generally to a passive millimeter-wave imaging system and, more particularly, to a passive millimeter-wave imaging system that provides a full 360° instantaneous field-of-view by utilizing a spherical Luneburg lens and a thin ring of millimeter-wave direct detection receivers positioned around the lens.

2. Discussion of the Related Art

Imaging systems that generate images of a scene by detecting background millimeter-wave radiation (30–300 GHz) given off by objects in the scene offer significant advantages over other types of imaging systems that provide imaging by detecting visible light, infrared radiation, and other electro-optical radiation. These advantages generally relate to the fact that millimeter-wave radiation can penetrate low visibility and obscured atmospheric conditions caused by many factors, such as clouds, fog, haze, rain, dust, smoke, sandstorms, etc., without significant attenuation, as would occur with the other types of radiation mentioned above. More particularly, certain propagation windows in the millimeter-wavelength spectrum, such as W-Band wavelengths at about 89 to 94 GHz, are not significantly attenuated by the oxygen and water vapor in air. Millimeter-wave radiation is also effective in passing through certain hard substances, such as wood and drywall, to provide imaging capabilities through walls. Thus, millimeter-wave imaging systems are desirable for many applications, such as aircraft landing, collision avoidance and detection systems, detection and tracking systems, surveillance systems, etc. Virtually any type of imaging system that can benefit by providing quality images under low visibility conditions could benefit by using millimeter-wave imaging.

Recent millimeter-wave imaging systems also can offer the advantage of direct detection. This advantage has to do with the fact the millimeter-wave receivers can include components that amplify, filter and detect the actual millimeter-wavelength signals. Other types of imaging system receivers, such as heterodyne receivers, generally convert the received radiation from the scene to intermediate frequencies prior to detection. Therefore, direct detection millimeter-wave receivers that detect the millimeter-wave radiation do not suffer from the typical bandwidth and noise constraints resulting from frequency conversion and do not include the components needed for frequency conversion.

Millimeter-wave imaging systems that use a focal plane imaging array to detect the millimeter-wave radiation and image a scene are known in the art. In these types of systems, the individual receivers that make up the array each includes its own millimeter-wave antenna and detector. An array interface multiplexer is provided that multiplexes the electrical signals from each of the receivers to a processing system. A millimeter-wave focal plane imaging array of this type is disclosed in U.S. Pat. No. 5,438,336 issued to Lee et al., titled "Focal plane Imaging Array With Internal Calibration Source." In this patent, an optical lens focuses millimeter-wave radiation collected from a scene onto an array of pixel element receivers positioned in the focal plane of the lens. Each pixel element receiver includes an antenna that receives the millimeter-wave radiation, a low noise amplifier that amplifies the received millimeter-wave signal, a bandpass filter that filters the received signal to only pass millimeter-wave radiation of a predetermined wavelength, and a diode integration detector that detects the millimeter-wave radiation and generates an electrical signal. The signal from each of the diode detectors is then sent to an array interface unit that multiplexes the electrical signals to a central processing unit to be displayed on a suitable display unit. Each pixel element receiver includes a calibration circuit to provide a background reference signal to the detector. Other types of focal plane imaging arrays including separate detecting pixel elements are also known in the art.

The millimeter-wave imaging systems known in the art typically have a finite field-of-view (FOV) that is limited to a certain angular range, for example 30°, relative to the imaging system. However, certain applications, for example, surveillance and reconnaissance or search and tracking applications, generally require a full 360° field-of-view (IFOV) imaging capability where each point around the system is imaged substantially simultaneously. Infrared search and track (IRST) systems are known in the art that provide this type of field-of-view capability. The IRST systems provide the 360° field-of-view by quickly rotating a scanning element. Because passive millimeter-wave imaging systems tend to be larger and bulkier compared with visible light and infrared imaging systems, 360° field-of-view systems have heretofore not been capable in the millimeter-wave environment.

What is needed is a millimeter-wave imaging system that provides a full 360° instantaneous field-of-view (IFOV) imaging. It is therefore an object of the present invention to provide such as imaging system.

Although the present invention focuses on passive millimeter-wave imaging (also known as radiometric imaging), its concept is applicable to all frequencies of the electromagnetic spectrum, from the lower radio frequencies, to the microwave frequencies, to submillimeter wave frequencies, and higher frequencies. It is also applicable to both active (radar) and passive (radiometric) systems.

SUMMARY OF THE INVENTION

In accordance with the teachings of the present invention, a passive millimeter-wave imaging system is disclosed that provides a full 360° instantaneous azimuthal field-of-view image of a scene. The imaging system makes use of a spherical Luneburg lens, and a series of millimeter-wave direct detection receivers configured in a ring around the lens and positioned at the focal surface of the lens. The series of receivers are positioned on a plurality of consecutive sensor cards, where each card includes a certain number of the receivers. In one embodiment, the receivers define a one-dimensional focal plane array that limits obscuration, and gives a 360° instantaneous field-of-view image slice of the scene. Processing circuitry, including a multiplexing array interface for multiplexing the signals from the receivers, are positioned on an outer ring outside of the sensor card ring. Mechanical actuators are provided to cause the rings to move together in a precessional motion about the lens so that the ring precesses at a fixed angle Θ about a fixed reference direction, thus providing an elevational scan of +/−Θ about the plane perpendicular to the reference direction. Therefore, the imaging system provides a full two-dimensional field of view of the scene about the lens.

Additional objects, advantages and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to a passive millimeter-wave imaging system providing a full 360° instantaneous field-of-view is merely exemplary in nature, and is in no way intended to limit the invention or its applications or uses. For example, this invention can be extended to achieve radar systems, as well as microwave sensors, not just passive and millimeter waves.

Figure 1:
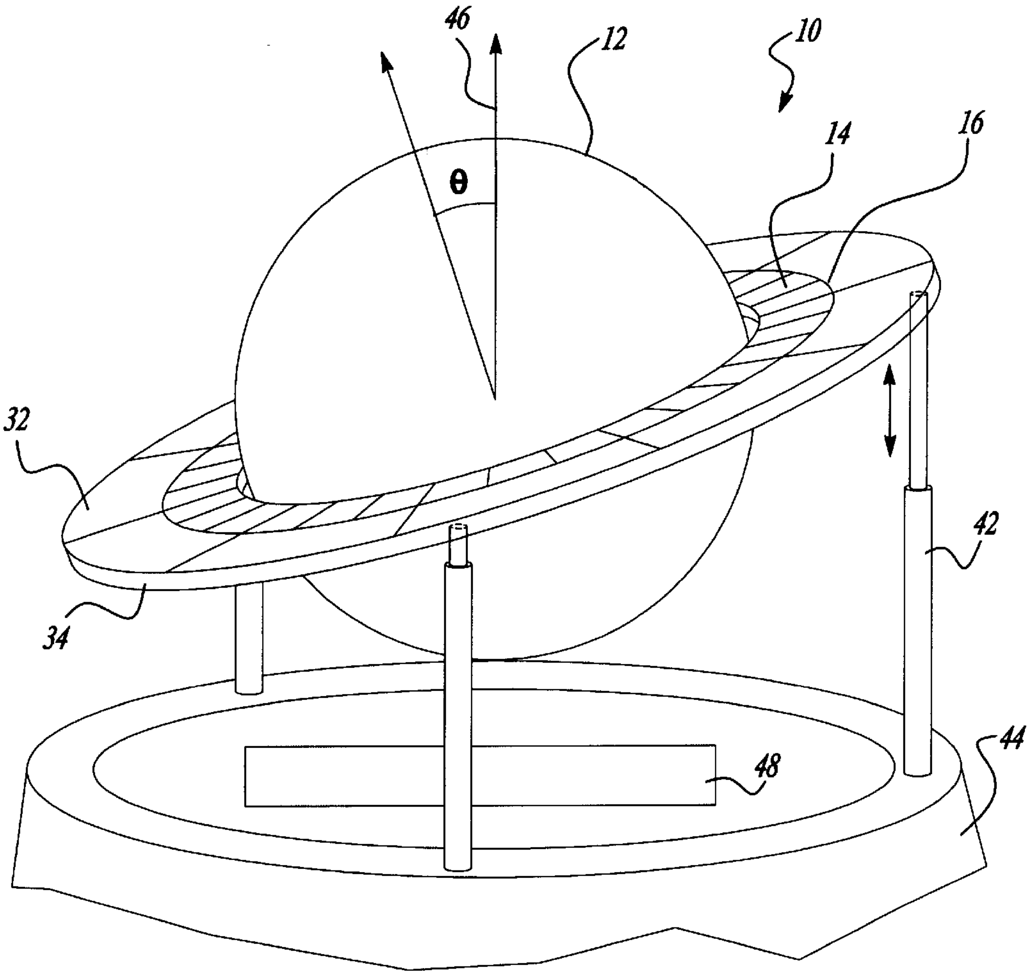
FIG. 1 is a perspective view of a passive millimeter-wave imaging system that provides a full 360° instantaneous field-of-view, according to an embodiment of the present invention.

FIG. 1 shows a perspective view of a passive millimeter-wave imaging system 10 that provides a full 360° instantaneous field-of-view image around the system 10. In order to image 360° around the system 10, a spherical lens 12 is provided to collect and focus millimeter-wave radiation in all directions from the scene. In one embodiment, the lens 12 is a "fish-eye" type lens, such as a Luneburg lens, known to those skilled in the art. The Luneburg lens 12 is a solid inhomogeneous lens that has a variable index of refraction, where the index of refraction is a maximum at the center of the lens 12 and gradually decreases to a value of unity at the outer surface of the lens 12. The design of a spherical Luneburg lens is such that if a point source is located on the surface, the lens transforms the resulting spherical waves into a plane wave having a propagating vector aligned along the diameter passing through the point source. When the lens 12 is placed in a homogeneous medium (air) having an index of refraction of unity, it brings to a sharp focus at a point on the surface of the lens 12 every parallel ray incident on the lens 12. The symmetry of the lens 12 thus provides an aberration-free imaging capability in any arbitrary direction.

According to the invention, for focusing millimeter-wave radiation, the lens 12 will be made of various composite materials, such as foam, that when combined, satisfy the index of refraction requirements of the Luneburg lens. The radius of the lens 12 would depend on the particular application, such as the specific millimeter-wavelengths being detected, and the resolution and detection distance desired. For most millimeter-wave applications, the lens 12 would probably have a diameter of about 2–5 feet. In this embodiment, the lens 12 is spherical, but for other applications, the lens 12 may take on other configurations, such as a half-sphere, or other segments of a sphere.

Figure 2:
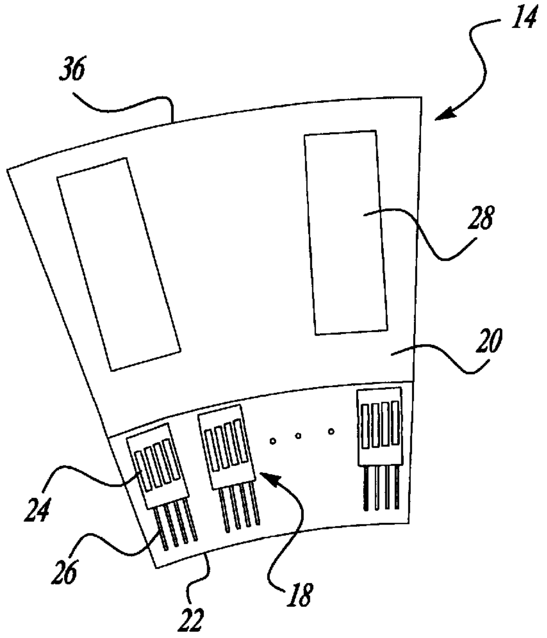
FIG. 2 shows a schematic plan view of a sensor card including a plurality of direct detection receivers associated with the imaging system shown in FIG. 1.

A plurality of interconnected one-dimensional sensor cards 14 are mounted as a ring structure 16 around the lens 12, as shown. FIG. 2 shows a schematic plan view of one of the sensor cards 14 separated form the system 10. Each sensor card 14 includes a plurality of receiver modules 18 mounted on a substrate 20. The substrate 20 includes a curved front edge 22 that conforms to the curvature of the lens 12. Each receiving module 18 includes a plurality of direct detection receivers 24 that are adjacent to each other and aligned in a row, where each receiver 24 images a pixel of the scene. In one embodiment, each sensor card 14 includes ten receiver modules 18, and each receiver module 18 includes four receivers 24. Therefore, each sensor card 14 is a one-dimensional focal plane array (FPA) that images forty pixels. Of course, the number of receiver modules 18 per sensor card 14, and the number of receivers 24 per receiving module 18 can vary from application to application. The size of each sensor card would depend on the number of receiver modules 18 and the number of receivers 24 per module 18, and the number of sensor cards 14 around the lens 12 would depend on the diameter of the lens 12, and the size of the sensor cards 14. In one embodiment, each of the sensor cards 14 is about 5 mm thick, and each receiver 24 is on a chip that is about 2 mm×7 mm. Therefore, the ring of sensor cards 14 only causes a slight negligible obscuration of radiation impinging on the lens 12 relative to the diameter of the lens 12. Of course, certain applications may require multiple stacked rings of the sensor cards 14 that would increase the thickness of the ring structure 16. The optimal implementation of the invention may include two adjacent arrays of millimeter-wave receivers 24 which are offset in azimuth by one-half a pixel width, because this arrangement, combined with the time sampling of the scene, insures the ability to optimally sample all parts of the field-of-view in both azimuth and elevation. It is noted that the individual separations in the ring structure 16 have been depicted as the sensor cards 14. However, these separations could also represent individual modules 18 that are attached together.

In this embodiment, each receiver 24 is a millimeter-wave monolithic integrated circuit (MMIC) receiver based on MMIC technology. The receivers 24 can be any suitable millimeter-wave direct detection receiver, known to those skilled in the art, that detects millimeter-wave radiation, and generates an indicative electrical signal, such as the receiver elements disclosed in the '336 patent. U.S. Pat. No. 5,530,247 discloses a millimeter-wave imaging system that uses ferroelectric elements to detect millimeter-wave radiation that are also applicable to use as the receivers 24. Each receiver 24 includes an antenna 26 and direct detection receiver components (not shown). The antennas 26 are mounted relative to the lens 12 so that the radiation collected by the lens 12 in various direction is focused onto the several antennas 26. Conditioning electronics 28 are provided to condition the electrical signals from the receivers 24 to provide various signal conditioning applications, such as current regulation, voltage conditioning, multiplexing, stop/read control electronics, etc., as would be well understood to those skilled in the art. The edges 22 of the cards 14 are closely spaced from the lens 12 in accordance with the optical algorithms and index of refraction requirements devised for a particular system. The antennas 26 will be close to the lens 12, but there will be air or a suitable optical lubricating material between the edge 22 and the lens 12 that provides a matching index of refraction with the lens 12. The substrates 20 can be interconnected by any suitable mechanical mechanism, such as glue or mechanical fasteners, to attach the sensor cards 14 to form the ring structure 16.

Figure 3:
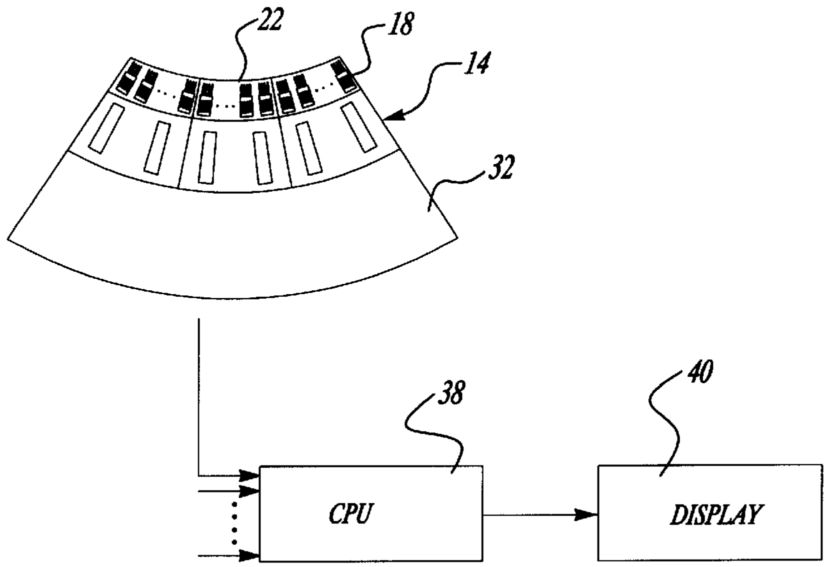
FIG. 3 shows a schematic plan view of a plurality of the sensor cards and processing electronics of the imaging system shown in FIG. 1.

Returning to FIG. 1, a plurality of multiplexing and processing electronics modules 32 are mounted together as a ring structure 34, and the ring structure 34 is attached to the ring structure 16 at an outer edge 36 of the sensor cards 14, as shown. FIG. 3 shows a broken-away plan view of a plurality of the sensor cards 14, here three, mounted to one of the electronics module 32. The number of sensor cards 14 being controlled by one electronic module 32 would depend on the number of sensor cards 14, the size of the lens 12, and the specific application. The electrical signals generated by each of the pixel element receivers 24 for a plurality of the receiver modules 18 are sent to the conditioning electronics 28 and then to one of the electronics modules 32. The modules 32 include all of the necessary processing circuitry, such an analog-to-digital converters for converting the analog electrical signals to digital signals, an array interface for multiplexing the signals from the receivers 24, and a processing unit for processing the multiplexed digital signals to generate the image. The electronics modules 32 and the sensor cards 14 can be combined into individual cards where all electronic functions are carried out. Electrical signals from all of the electronics modules 32 are then sent to a main processing unit 38 that combines all the signals from all of the units 32 to be displayed to any necessary image enhancements, and display the enhanced image on a display device 40. The electronics required to transfer the electrical data to an image is straight forward, and well known to those skilled in the art. The display device 40 can be any suitable display for the particular application.

The imaging system 10 provides a 360° instantaneous field-of-view image at any moment in time for a one-dimensional slice of the scene, as defined by the position of the receivers 24. To make the system 10 more practical for imaging, an elevation of the IFOV needs to be provided. This can be done by stacking several of the ring structures 16 for a limited elevation IFOV. But as the thickness of the ring structure 16 increases, more of the radiation impinging the lens 12 is obscured. Another technique would be to move the ring structure 16 relative to the lens 12 in some type of a scanning motion. For example, the ring structure 16 can be moved up and down relative to the lens 12 in a "push-broom" type scan. Of course, the close coupling between the lens 12 and the receivers 24 must be maintained, and the antennas 26 must remain optimally pointed towards the center of the lens 12. Further, a large spherical displacement also causes an increasingly wider shadow to be cast by the ring structure 16 itself, thus increasing the sidelobe level.

In accordance with the teachings of the present invention, the ring structures 16 and 34 are moved relative to the lens 12 in a precessing motion to provide an elevational scan of the IFOV, and significantly provide for the requirements discussed above. A plurality of linear actuators 42 are mounted to a base structure 44 and to an outer edge of the ring structure 34. The lens 12 would also be mounted to the base structure 44 by suitable brackets (not shown) that are positioned outside of the field-of-view of the system 10. In this embodiment, there are three vertical actuators 42, but as will be appreciated by those skilled in the art, more than three actuators can be provided for different applications. The actuators 42 can be any suitable mechanical actuator that moves up and down in a controlled manner to cause the ring structure 34 to be moved in a precessing motion. The actuators 42 are moved up and down in connection with each other in a direction normal to the plane of the ring structure 34 so that the ring structure 34 recesses at a fixed angle Θ about a fixed reference direction 46 relative to the lens 12. A control unit 48 is programmed to control the actuation of the actuators 42 so that they move the ring structure 34 in the precessing motion. In one embodiment, the actuators 42 move in such a manner so that the highest portion of the ring structure 34 rotates or scans around the lens 12 in a clockwise direction. During the precessing motion, the lens 12 remains stationary, and each receiver 24 remains at the focal surface of the lens 12 with its antenna 26 pointed towards the center of the lens 12.

Figure 4:
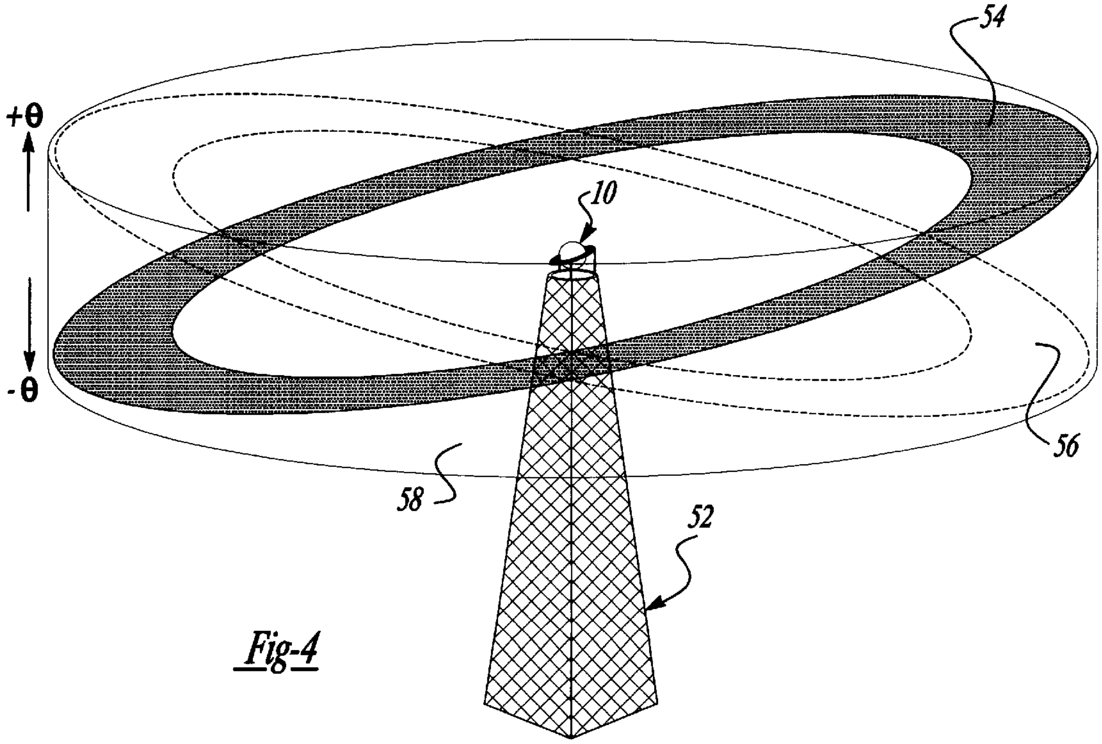
FIG. 4 shows a perspective view of the field-of-view of the imaging system shown in FIG. 1.

FIG. 4 shows a diagrammatic view of the field-of-view of the system 10. In this depiction, the system 10 is mounted to a supporting mast 52 to image a scene 360° around the system 10. A field-of-view ring 54 represents the instantaneous field-of-view of the system 10 for a given position of the ring structure 16 at a given moment in time. Another instantaneous field-of-view of the system 10 is shown by a phantom field-of-view ring 56 when the ring structure 34 is in an opposite orientation relative to the lens 12. A cylinder 58 defines the overall field-of-view of the system 10 after a complete precessional movement of the ring structure 34, as represented by +/−Θ. In one embodiment, the ring structure 34 will move in one complete precessional path in about one second. As is apparent, actuation of the actuators 42 causes the ring structure 34 to move in a precessing movement about the lens 12 so that the ring structure 34 precesses at the angle Θ about the reference direction 46, thus provided an elevational scan of +/−Θ about a plane perpendicular to the reference direction 46. The degree of precession of the ring structure 34 relative to the lens 12 determines the angle Θ, and sets the elevation of cylinder 58. This degree of precession can be adjusted for larger or smaller scans. In this example, the movement of the actuators 42 causes the field-of-view ring 54 to rotate in a clockwise direction to fill the volume of cylinder 58.

The foregoing discussion discloses and describes merely exemplary embodiments of the present invention. One skilled in the art will readily recognize from such discussion, and from the accompanying drawings and claims, that various changes, modifications and variations to be made therein without departing from the spirit and scope of the invention as defined in the following claims.

What is claimed is:

1. An imaging system for generating an image of a scene, said system comprising:

a lens, said lens collecting and focusing radiation from the scene;

a plurality of radiation receivers positioned completely around the lens and detecting the radiation collected by the lens to provide a 360° instantaneous field-of-view around the system; and a processing system receiving electrical signals from the plurality of receivers, said processing circuitry generating an image of the scene from the electrical signals.

2. The system according to claim 1 wherein the lens is a spherical lens.

3. The system according to claim 1 wherein the plurality of receivers are positioned on a plurality of sensor cards attached together to form a ring structure around the lens, and wherein a plurality of the plurality of receivers are on each sensor card.

4. The system according to claim 3 wherein each sensor card has a thickness of about 5 mm or less.

5. The system according to claim 3 wherein the plurality of receivers define a one-dimensional focal plane array positioned at the focal plane of the lens.

6. The system according to claim 1 wherein the processing system includes processing circuitry formed on a ring structure connected to the receivers and being on an opposite side of the lens from the receivers.

7. The system according to claim 1 wherein the receivers are direct detection receivers.

8. The system according to claim 1 wherein the lens collects and focusses millimeter-wave radiation and the receivers detect the millimeter-wave radiation.

9. A millimeter-wave radiation imaging system for generating an image of a scene, said system comprising:

a spherical lens, said spherical lens collecting and focusing millimeter-wave radiation from the scene;

a plurality of millimeter-wave radiation receivers positioned around the lens and detecting the millimeter-wave radiation collected and focussed by the lens, the plurality of receivers being positioned on a plurality of sensor cards that are attached together to form a first ring structure around the lens, said plurality of receivers providing electrical signals of the received radiation to define a 360° instantaneous field-of-view around the system; and a processing system receiving the electrical signals from the receivers and generating an image of the scene, said processing system including processing circuitry positioned on a second ring structure connected to the first ring structure and being on an opposite side of the lens from the first ring structure.

10. The system according to claim 9 wherein the lens is a Luneburg type lens having a varying index of refraction from a center of the lens to an outer surface of the lens.

11. The system according to claim 10 wherein the lens is made of composite foams.

12. The system according to claim 9 wherein each sensor card has a thickness of about 5 mm or less.

13. The system according to claim 9 wherein the receivers are direct detection receivers.

14. The system according to claim 9 further comprising an actuation system, said actuation system being connected to the second ring structure and actuating the second ring structure to cause it to precess around the lens at a fixed angle relative to a fixed reference direction to provide an elevational scan of the 360° field-of-view about a plane perpendicular to the reference direction.

15. The system according to claim 14 wherein the actuation system includes a plurality of linear actuators disposed around the second ring structure.

16. A millimeter-wave radiation imaging system for generating a 360° instantaneous image of a scene, said system comprising:

a spherical Luneburg-type lens having a varying index of refraction from a center of the lens to an outer surface of the lens, said spherical lens collecting and focusing millimeter-wave radiation from the scene;

a plurality of sensor cards attached together to form a first ring structure around the lens, each of said sensor cards including a plurality of millimeter-wave direction detection radiation receivers positioned in the focal plane of the lens to define a one-dimensional focal plane array, said plurality of receivers detecting the millimeter-wave radiation collected and focussed by the lens and providing electrical signals of the received radiation to define a 360° instantaneous field-of-view around the system;

a processing system receiving the electrical signals from the receivers and generating an image of the scene, said processing system including processing circuitry positioned on a second ring structure connected to the first ring structure and being on an opposite side of the lens from the first ring structure; and an actuation system connected to the second ring structure and actuating the second ring structure to cause the first ring structure to precess around the lens at a fixed angle relative to a fixed reference direction to provide an elevational scan of the 360° field-of-view about a plane perpendicular to the reference direction.

17. The system according to claim 16 wherein each sensor card has a thickness of about 5 mm or less.

18. The system according to claim 16 wherein the lens is made of composite foams.

19. A method of generating an image of a scene, said method comprising the steps of:

providing a lens;

collecting and focusing millimeter-wave radiation with the lens;

providing a plurality of millimeter-wave radiation receivers positioned around the lens in a ring configuration such that the receivers are in the focal plane of the lens;

detecting the millimeter-wave radiation collected by the lens to provide a 360° instantaneous field-of-view around the lens; and providing an image of the scene based on the detected radiation from the receivers.

20. The method according to claim 19 wherein the step of providing a lens includes providing a Luneburg-type lens having a varying index of refraction from a center of the lens to an outer surface of the lens.

21. The method according to claim 19 further comprising the step of moving the ring of receivers about the lens in a precessional motion to provide an elevational scan of the 360° field-of-view.

22. An imaging system for generating an image of a scene, said system comprising:

a Luneberg lens having a varying index of refraction from a center of the lens to an outer surface of the lens, said lens collecting and focusing radiation from the scene;

a plurality of radiation receivers positioned around the lens and detecting the radiation collected by the lens to provide a 360E instantaneous field-of-view around the system; and a processing system receiving electrical signals from the plurality of receivers, said processing circuitry generating an image of the scene from the electrical signals.

23. The system according to claim 22 wherein the lens is made of composite foams.

24. An imaging system for generating an image of a scene, said system comprising:

a lens, said lens collecting and focusing radiation from the scene;

a plurality of radiation receivers positioned around the lens and detecting the radiation collected by the lens to provide a 360E instantaneous field-of-view around the system, wherein the plurality of receivers are positioned on a plurality of sensor cards attached together to form a ring structure around the lens, and wherein a plurality of the plurality of receivers are on each sensor card;

a processing system receiving electrical signals from the plurality of receivers, said processing circuitry generating an image of the scene from the electrical signals; and an actuation system, said actuation system being connected to the ring structure and actuating the ring structure to cause it to move relative to the lens.

25. The system according to claim 24 wherein the actuation system causes the ring structure to precess around the lens at a fixed angle relative to a fixed reference direction to provide an elevational scan of the 360° field-of-view.

26. The system according to claim 24 wherein the actuation system includes a plurality of linear actuators disposed around the ring structure.

* * * * *